May 5, 1970     J. D. SHAW     3,509,878

VECTORCARDIOGRAPH

Filed May 23, 1968     2 Sheets-Sheet 1

INVENTOR
Joseph D. Shaw
BY Walter S. Murray
ATTY.

INVENTOR
Joseph D. Shaw

United States Patent Office 3,509,878
Patented May 5, 1970

3,509,878
VECTORCARDIOGRAPH
Joseph D. Shaw, 508 Church St.,
Brownsville, Pa. 15412
Filed May 23, 1968, Ser. No. 731,511
Int. Cl. A61b 5/04
U.S. Cl. 128—2.06                                    1 Claim

ABSTRACT OF THE DISCLOSURE

Apparatus for coordinating and recording variations in a plurality of electrical potentials on a single record sheet which has two closely spaced apart grids that receive the record sheet therebetween; each grid having a series of discrete, electrically conductive filaments with the elements of one grid extending in a direction different from the filaments of the other grid to provide a series of potential current conducting paths at the cross over points of opposed grid filaments.

---

The apparatus includes a switching means for each grid adapted to selectively connect an electrical potential to a filament of that grid in response to variations of said potential; and voltage means adapted to create an electrical current across energized grid paths to make a series of marks on the record sheet.

This invention relates to improvements in recording apparatus and is particularly directed to a novel recorder having plural and independent signal sensing means that produce a single and permanent graph configuration.

An object of the invention is to provide apparatus adapted to permanently record at least two substantially different, independently sensed electrical events on a single graph such as the potential difference existing between two sets of body contacting electrodes that sense minute electrical currents generated in the heart of a patient.

Another object of the invention is to provide a pair of spaced grids that receive a sheet of sensitized paper between them, the discrete, electrically conduction elements of each grid being connected to a multiple switch means that is actuated by a detecting means responsive to the intensity of an electric current whereby paper marking electric currents are produced between the grids in response to different electrical events separately fed to the detecting means.

Other objects and advantages of my invention will be best understood from the following description and accompanying drawings, in which I have shown preferred embodiments of the invention.

Figure 1:
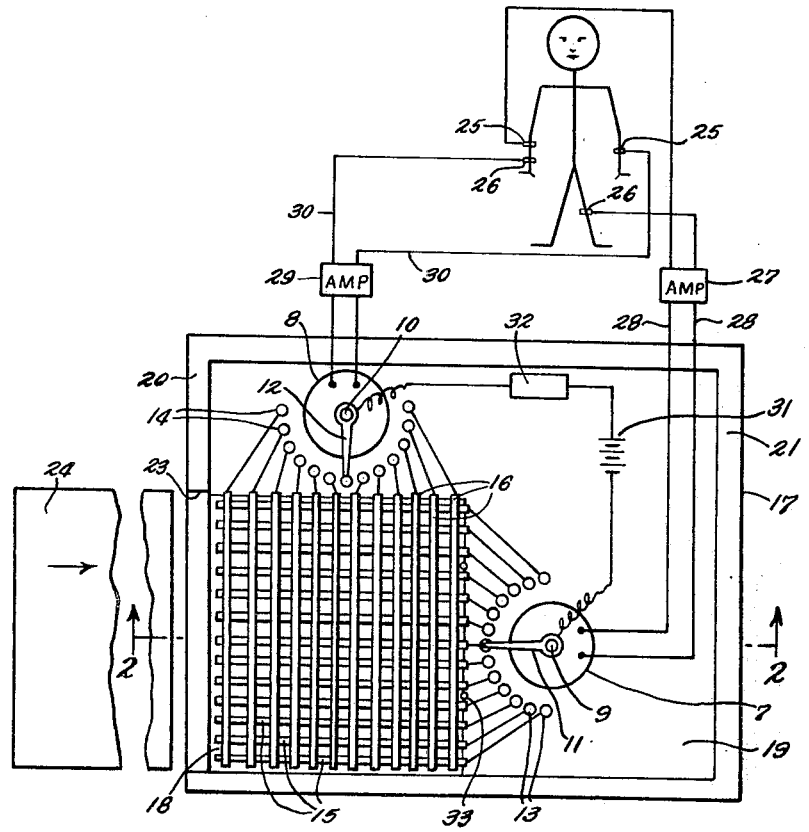
FIG. 1 is a fragmental plan view of my recorder illustrated in conjunction with vectorcardiograph apparatus, parts being shown diagrammatically and the recorder top removed.
Figure 2:
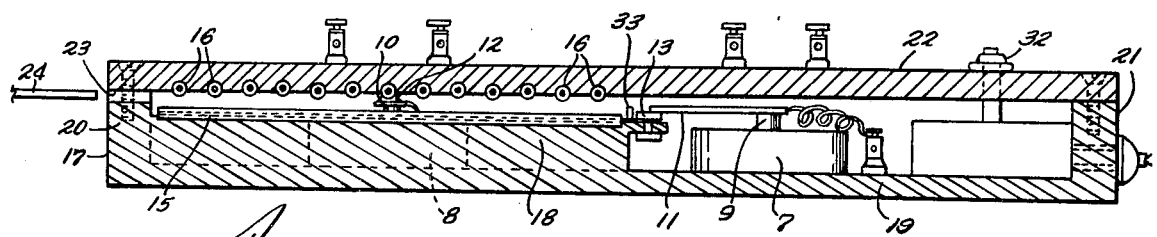
FIG. 2 is an enlargde section taken on line 2—2 of FIG. 1.

Referring to FIGS. 1 and 2 of the drawings the numerals 7 and 8 are detecting means responsive to the intensity of an electric current such as a galvanometer, each galvanometer having a rotor output shaft 9 and 10, respectively. A multiple switch means is operated by each shaft 9 and 10 which has operatively fixed thereto a stylus 11 and 12, respectively, each stylus being adapted to sweep across a set of fixed contacts 13 and 14, respectively. Each contact in the set 13 is connected to one of a series of parallel, spaced apart, electrically conductive elements 15, preferably in the form of straight wire filaments that are separated from each other by electrical insulating material to form what is termed herein as an "X grid." Each contact in the set 14 is connected to one of the series of parallel, spaced apart, electrically conductive elements 16 in the form of straight wire filaments that may be separated from each other by electrical insulating material, said series of wires being referred to herein as a "Y grid." It will be noted with reference to FIG. 1 that the filaments of the X grid extend in a direction at right angles to the filaments of the Y grid and that potential current conducting paths are created at each place an X grid filament crosses under a Y grid filament because, as indicated in FIG. 2, those portions of the electrical conductive elements 16 of the Y grid which cross over the electrical conductive elements 15 of the X grid have the insulation removed therefrom. The insulation material on those portions of the conductive elements of the X grid which cross over the Y grid may also have their insulation material removed, if desired.

Now with reference to FIG. 2 of the drawings it will be noted that the apparatus described heretofore is housed in a case 17 made of electrical insulating material, said case having a bottom portion 18 designed to position the wires 15 of the "X grid" and the set of contacts 14 and a relatively lower bottom portion 19 for supporting the galvanometers 7 and 8. The case has side walls 20 and 21 and a top wall 22, the latter wall supporting the set of wire filaments 16 and the set of contacts 13 for said wires. It will be noted that the wires 16 of the "Y grid" are in close spaced relation above the wires 15 of the "X grid" and a slot 23 is formed in the side wall 20 to receive and guide a sheet of electro-sensitive paper 24 into the housing and align it between the X and Y grids.

My recording apparatus is best illustrated as it is applied to vectorcardiograph apparatus, and as best shown in FIG. 1, a plural sensing means is indicated by two sets of body contacting electrodes adapted to pick up two electrical events, generated by the heart muscles of a patient. The reference numerals 25—25 indicate one set of body contacting electrodes while the reference numerals 26—26 indicate the other set of body contacting electrodes. Circuit means connecting the electrodes 25—25 to the galvanometer 7 include an amplifier 27 interposed in the leads 28—28 of said circuit means while the circuit means connecting the electrodes 26—26 to the galvanometer 8 includes an amplifier 29 interposed in the circuit leads 30—30 for said circuit means. A current producing means connects the stylus 11 to the stylus 12 and includes a voltage source such as a battery 31 and a timing switch means 32 connected in series to the said styli.

Figure 3:
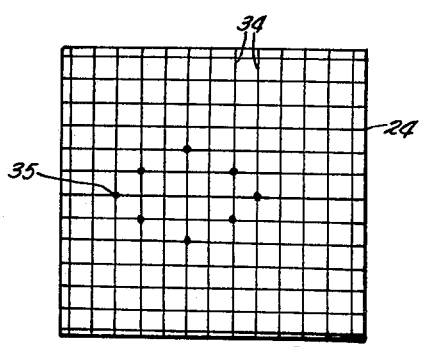
FIG. 3 is a plan view of a recording sheet for the recorder shown in the drawings.

In order to operate the apparatus a sheet of electrosensitive paper 24 is inserted edgewise through the slot 23 into the case 17 and is accurately positioned between the X and Y grids by means of the sides of the slot and end stop pins 33 extending upwardly from the bottom 18 of the case. In some kinds of recordation it is advisable to use recording sheets having graph lines 34 (FIG. 3) printed thereon. To record two electrical events on the paper 24 the electrodes 25—25 are, for example, positioned in skin contact with a patient's right and left arms to sense one electrical potential while the electrodes 26—26 are positioned, say on the patient's right arm and left leg, to sense another electrical potential. A circuit means, including a voltage amplifier, connect each electrical event occurring between electrode sets 25—25 and 26—26 with a galvanometer 7 and 8, respectively, each galvanometer being thereby independently actuated to sweep its respective stylus over its set of contacts. As a particular set of filaments 15 and 16 in the grids X and Y, respectively, are simultaneously connected by their respective stylus to the source of voltage, an electrical conducting path will be created across their crossed over portions and a permanent mark will be recorded on the electro-sensitive paper at that place. As the potentials of the two events continuously change a set of marks will be recorded on the paper 24, for example, the oval shaped configuration 35 illustrated in FIG. 3 of the drawings.

Figure 4:
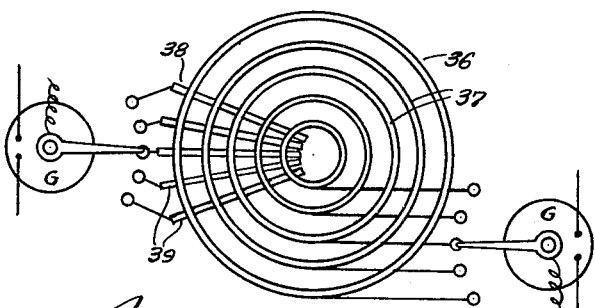
FIG. 4 is a plan view of a modified form of my recorder, parts being shown diagrammatically.

In FIG. 1 there is illustrated a recorder means wherein the grids X and Y have their electrically conductive elements disposed at right angles to each other to provide a rectilinear recording means while in FIG. 4 there is illustrated modified forms of recorder grids wherein the grid 36 has a series of circular and concentric electrically conductive elements 37 while the grid 38 has a series of straight electrically conductive elements 39 converging toward the center of the grid 36 on equi-angular positions relative to each other. The recorder grids 36 and 38 illustrated in FIG. 4 are adapted to convert two linear functions into polar coordinates for a specialized recordation of two electrical events on a single recordation sheet.

Figure 5:
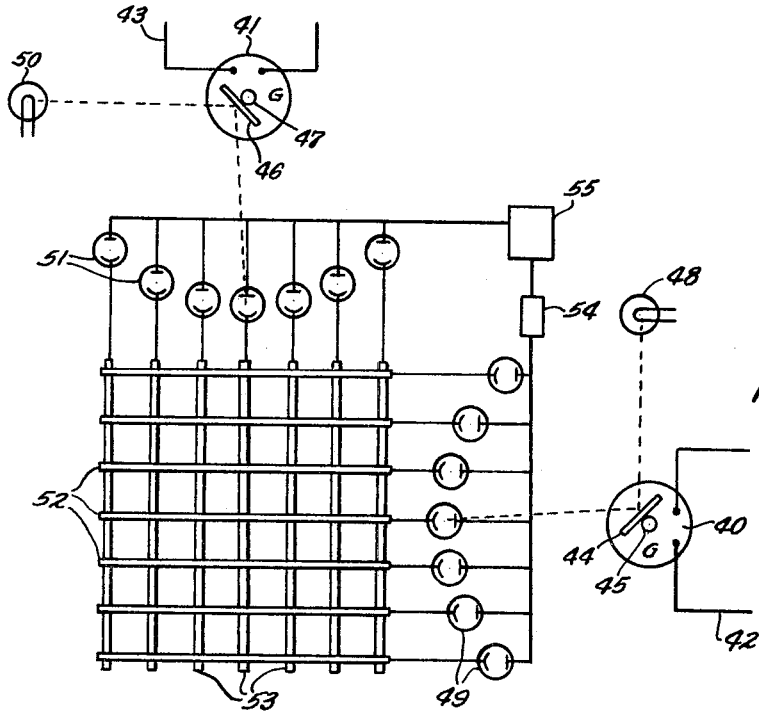
FIG. 5 is a further modification of my recording apparatus depicted diagrammatically.

Now with reference to FIG. 5 of the drawings which illustrates a modified form of my recorder the numerals 40 and 41 are galvanometers responsive to the intensity of electric currents in the circuit means 42 and 43, respectively. A multiple switch means is provided each galvanometer by the expedient of mounting a light reflective mirror 44 on the rotor output shaft 45 of the galvanometer 40 and fixing a light reflective mirror 46 on the rotor shaft 47 of the galvanometer 41. A laterally restricted ray of reflected light from the light source 48 is swept across a set of fixed photoelectric cells 49 by the mirror 44 while a reflected ray of light from a light source 50 is swept across a set of fixed photoelectric cells 51. Each of the cells 49 is connected to one of a series of discrete, electrically conductive elements 52 forming an X grid while each of the cells 51 is connected to one of a series of electrically conductive elements 53 forming a Y grid, said grids being adapted to receive a sheet of electrosensitive paper 24 between them for marking purposes. As in the preferred embodiment of my invention a current producing means connects the set of cells 49 to the set of cells 51 and includes a voltage source 54 and a current switching means 55 such as a simple "off-on" switch or an elaborate timer (not shown).

Figure 6:
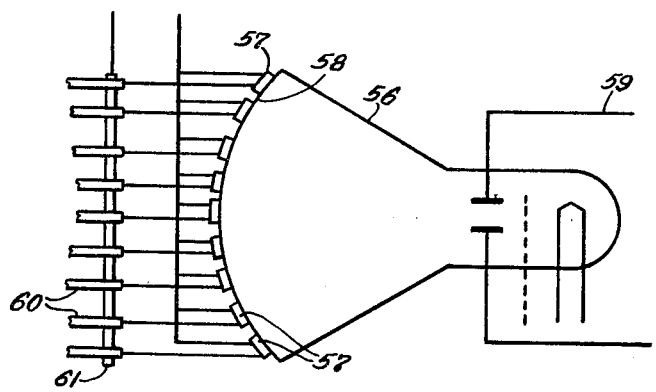
FIG. 6 is a diagrammatic view of another modified form of my recording apparatus.

In operation as each galvanometer detects current changes in their respective circuits light reflected from their respective mirrors falls onto each set of cells, and electric current conduction becomes possible in the particular cells receiving the reflected light. Due to the decreased resistance in particular cells electric current will be conducted through the electrosensitive paper as crossed over portions of the elements in the X and Y grids become energized. A further modified form of the multiple switch means is depicted in FIG. 6 of the drawings and comprises a cathode ray tube 56 having a set of fixed photoelectric cells 57 mounted on the screen 58 of the tube. The variable intensity in the electric circuit 59 controls a ray beam that moves across the set of cells 57 which causes current conducting paths between the electrically conductive elements 60 of an X grid and the elements 61 of a Y grid when two cathode ray tubes are utilized as in the form of my recording device, illustrated in FIG. 5 of the drawing.

While I have illustrated by recording apparatus in selected forms for use in producing vectorcardiographs it is to be understood that various changes of the details may be made in the apparatus and the apparatus put to other usages by those skilled in the art without departing from the invention expressed in the appended claim.

What is claimed is:

1. Apparatus for recording at least two cyclic electric potentials initiated by the action of the human heart comprising a first set of body engaging electrodes, a second set of body engaging electrodes, a pair of grids disposed in spaced apart positions, means positioning an electrosensitive recording means between the grids, each grid having a series of discrete, electrically conductive elements, said elements of one grid extending in different directions from the directions of the elements in the other grid, a multiple switching device for the elements of each grid, a detecting means responsive to the changes of electrical potential operatively connected to each switching device, circuit means connecting each set of electrodes to a detecting means, an electric amplifier interposed in each circuit means, a voltage source, and means connecting each switching device with one lead of the voltage source whereby a closed series of marks are produced on the recording means by current conducting paths created across adjacent grid elements.

References Cited

UNITED STATES PATENTS

| | | | |
|---|---|---|---|
| 2,501,791 | 3/1950 | Silverman | 346—33 |
| 2,610,102 | 9/1952 | Gitzendanner et al. | 346—34 |
| 2,686,222 | 8/1954 | Walker et al. | 340—166 X |
| 2,869,965 | 1/1959 | Willard | 346—74 |
| 3,090,828 | 5/1963 | Bain | 178—6.6 |
| 3,214,765 | 10/1965 | Bond | 346—74 |

JOSEPH W. HARTARY, Primary Examiner

U.S. Cl. X.R.

346—35, 74

PO-1050
(5/69)

UNITED STATES PATENT OFFICE
CERTIFICATE OF CORRECTION

Patent No. 3,509,878          Dated May 5, 1970

Inventor(s) Joseph D. Shaw

It is certified that error appears in the above-identified patent and that said Letters Patent are hereby corrected as shown below:

In Fig. 1 of the drawing the center contact of the set of contacts 14 shown engaging pointer 12 should have been connected to a center element (not shown) of the series of parallel, spaced apart, electrical conductive elements 16.

Signed and sealed this 22nd day of February 1972.

(SEAL)
Attest:

EDWARD M. FLETCHER, JR.          ROBERT GOTTSCHALK
Attesting Officer                  Commissioner of Patents